Figure 1:
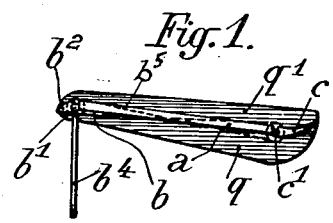

R. ARNOUX.
AEROPLANE.
APPLICATION FILED NOV. 20, 1909.

1,095,952.

Patented May 5, 1914.

3 SHEETS—SHEET 1.

Witnesses:

Inventor
René Arnoux
By James L. Norris
Atty

R. ARNOUX.
AEROPLANE.
APPLICATION FILED NOV. 20, 1909.

1,095,952.

Patented May 5, 1914.

3 SHEETS—SHEET 2.

Witnesses:

Inventor
René Arnoux
by James L. Norris

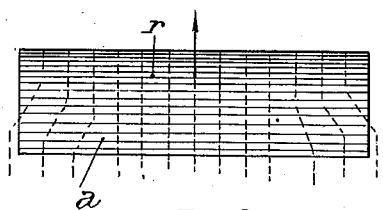
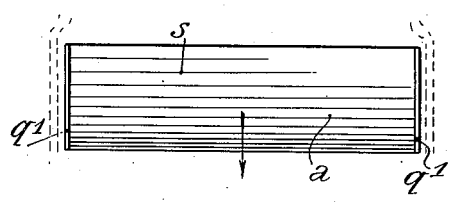
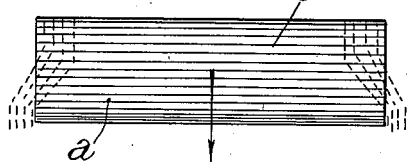
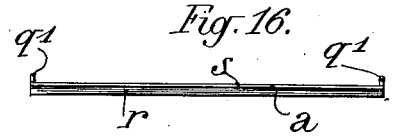
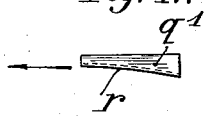
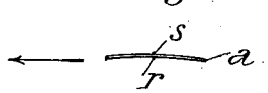
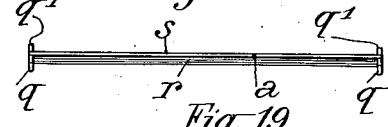
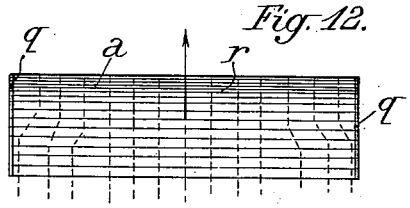
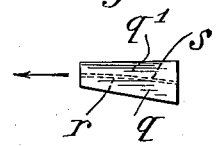

UNITED STATES PATENT OFFICE.

RENÉ ARNOUX, OF PARIS, FRANCE.

AEROPLANE.

1,095,952. Specification of Letters Patent. Patented May 5, 1914.

Application filed November 20, 1909. Serial No. 529,153.

*To all whom it may concern:*

Be it known that I, RENÉ ARNOUX, engineer, a citizen of the French Republic, residing at 45 Rue du Ranelagh, Paris, France, have invented certain new and useful Improvements in Aeroplanes, of which the following is a specification.

The present invention relates to improvements in aeroplanes and has for one of its primary objects to provide the sustaining wings or surfaces of an aeroplane with planes which are pivotally mounted on the front or rear edges of the sustaining wings or upon both of these edges, these planes being pivotally mounted at opposite sides of the longitudinal axis of the structure and adjustable with respect to the wings whereby the flight or direction of movement of the aeroplane can be altered without the necessity of using the ordinary steering and elevation rudders, the weight and dimensions of the structure and the retarding resistance offered by it being thereby considerably reduced. Preferably, these adjustable planes are provided both upon the front and rear edges of the wings in order that they may act most effectively upon the layers of air which contact with both the upper and lower surfaces of the supporting or sustaining wings.

Another object of the invention is to provide the supporting or sustaining wings with lamels which during the flight of the aeroplane are acted upon by the layers of air to produce vibratory effects somewhat analogous to the action of the feathers of certain birds, these lamels promoting and in fact assisting in the forward propulsion of the aeroplane and enabling the aeroplane to hover against the wind.

A further object of the invention is to provide an aeroplane of the construction above described with flanges which are arranged on the lateral edges of the supporting or sustaining wings, these flanges projecting downwardly or both downwardly and upwardly with respect to the supporting wing and serving to prevent lateral flow of air from beneath the supporting wing in an outward direction and also serving to prevent lateral flow of air above the supporting wing and in an inward direction, the maximum effect of the air being thereby utilized not only upon the supporting wing but also upon the adjustable planes at the front and rear edges thereof, and this effect is accomplished without materially increasing the retarding surface offered to the air.

To these and other ends, the invention consists in certain improvements, and combinations and arrangements of parts, all as will be hereinafter more fully described, the novel features being pointed out particularly in the claims at the end of the specification.

Figure 2:
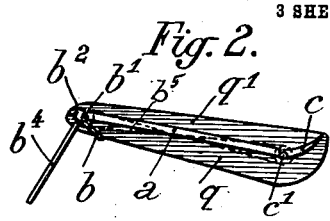
Figure 3:
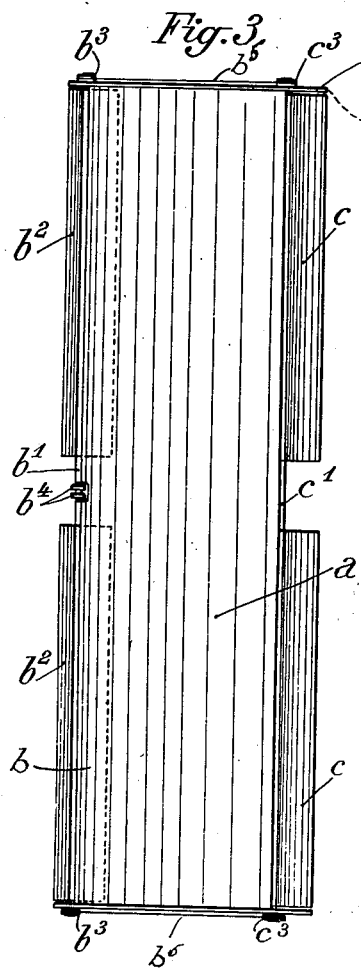
Figure 4:
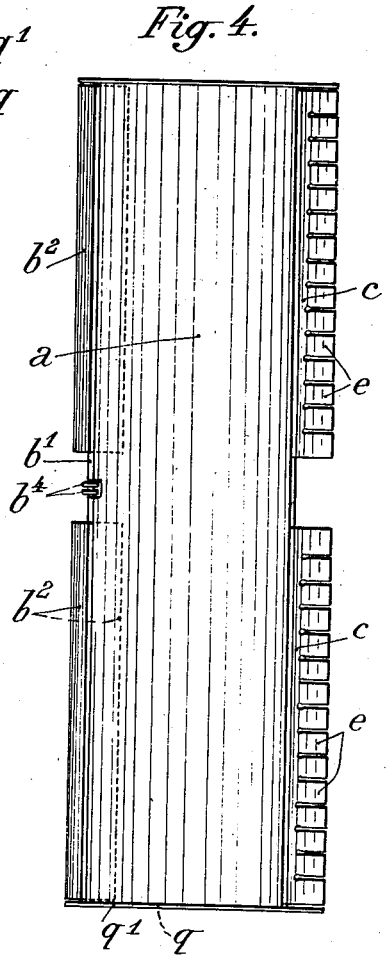
Figure 5:
Figure 6:
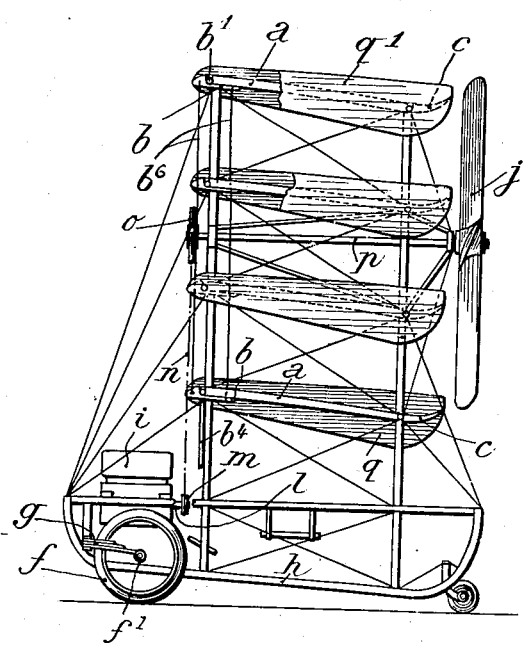
Figure 7:
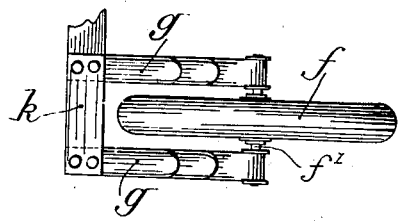

In the accompanying drawing: Figure 1 is a side elevation of the wing of an aeroplane provided with adjustable planes at its front and rear edges; Fig. 2 is a view similar to Fig. 1 showing the adjustable planes in different positions; Fig. 3 is a plan view of the wing and the adjustable planes as shown in Fig. 1; Fig. 4 is a plan view of a wing having adjustable planes at its forward edge and lamels at its rear edge; Fig. 5 is a diagrammatic view of an ordinary wing equipped with the usual rotatable planes; Fig. 6 is a side elevation of an aeroplane embodying the different features of my invention; Fig. 7 is a plan view of the mounting for one of the supporting wheels; Figs. 8 to 11 are diagrammatic views of an ordinary wing or plane showing the manner in which it acts upon the air; Figs. 8 and 9 being bottom and top plan views respectively, and Fig. 10 representing a front edge view; Figs. 12 to 14 inclusive show diagrammatically a wing provided with depending flanges at its lateral edges in accordance with the present invention; Fig. 12 representing a bottom plan view of the wing, and Figs. 13 and 14 representing respectively front and side elevations; Figs. 15 to 17 inclusive show a wing provided with upstanding flanges at its lateral edges; Fig. 15 representing a top plan view, and Figs. 16 and 17 representing respectively front and side elevations; Figs. 18 and 19 represent respectively front and side elevations of a wing having flanges at its lateral edges which project both upwardly and downwardly; and Fig. 20 is a front elevation of a wing having flanges at its lateral edges which proceed upwardly and downwardly at oblique angles.

Similar parts are designated by the same reference characters in the several views.

According to the present invention each wing $a$ is provided as shown in Figs. 1 to 3 inclusive, with planes $b$ at its front edge, one of these planes being preferably arranged at each side of the longitudinal axis of the wing and the two wings are rotatably mounted upon a supporting shaft $b'$. These planes $b$ are preferably independently or adjustably rotatable upon their supporting shaft and in order to counterbalance the planes they are shown in the present instance as provided with forwardly projecting ribs $b^2$ The rear edge of the wing is shown in these figures as provided with two planes $c$ which are also preferably mounted for independent adjustment or rotation on a supporting shaft $c'$. Any suitable means may be provided for adjusting the planes $b$ and $c$, pulleys $b^3$ and $c^3$ being provided in the present instance which are operatively connected to the respective pairs of forward and rear planes $b$ and $c$, and these pulleys are connected by crossed belts $b^5$ or their equivalents whereby simultaneous adjustment or rotation of the forward and rear planes in reverse directions may be accomplished. To enable the operator to conveniently adjust the planes $b$ and $c$, the shaft $b'$ of the lowermost wing of the machine may support a pair of adjusting levers $b^4$. Simultaneous adjustment of the front and rear planes of the different wings may be accomplished by cords $b^6$ as shown in Fig. 6 in those cases where a plurality of superposed wings are used. These adjustable planes perform the functions of steering the aeroplane laterally in either direction and insuring longitudinal stability, the front planes being normally set at a greater angle to the trajectory of the aeroplane than the surfaces offered by the supporting or sustaining wings, greater stability of the aeroplane being thereby insured and the use of devices for steering or otherwise establishing equilibrium of the aeroplane, such as the elevation and steering rudders which project from the main structure, is avoided.

The adjustable planes provided by the present invention are also essentially different in their action from the tiltable planes as heretofore used. Fig. 5 illustrates diagrammatically by the full lines the manner in which the adjustable planes as heretofore used act. They are both directed downwardly and have the tendency to cause descent of the aeroplane rather than to increase the sustaining effect as in the present instance. The dotted lines in this figure illustrate diagrammatically the manner in which the planes are set according to the present invention, and the curved arrows indicate the couple of forces produced by the action of the air on the planes. These adjustable planes perform the functions of steering the aeroplane and insuring longitudinal stability thereof, the forward planes which first encounter the air being presented to the trajectory at an angle not less than the angle of the sustaining wing or plane and being adjustable to different angles greater than the sustaining wing or plane, and the rear adjustable planes being presented to the trajectory always at an angle not greater than that of the sustaining plane and being adjustable to different angles less than that of the sustaining plane, the corresponding front and rear adjustable planes being in the present instance connected operatively whereby they are adjusted simultaneously and in reverse directions, and that portion of the forward adjustable plane $b$ which extends to the rear of its pivot serves as a stop to prevent the forward planes from occupying an angle less than that presented by the sustaining wing or plane to the trajectory and preventing the rear adjustable plane from occupying a greater angle to the trajectory than that of the sustaining plane.

In Fig. 4 I have shown the rear edge of one of the planes as provided with independent lamels $e$, the vibratory effect of these lamels enabling the aeroplane to hover against a wind. These lamels may be made of any suitable material possessing the requisite elasticity, and they are preferably fixed directly to the rear edges of the wings.

Fig. 6 represents a side elevation of an aeroplane embodying a set of four superposed wings. The aeroplane embodies an appropriate frame which is preferably mounted upon wheels $f$ and in order to avoid injury to the wheels and to minimize shocks incident to the landing of the aeroplane, the axle $f'$ of each wheel is shown in the present instance as attached to the ends of a pair of leaf springs $g$ arranged at opposite sides of the wheel and the ends of these springs are bolted or otherwise secured to a block $k$ attached to the frame. These springs $g$ are preferably in the form of quarter elliptic springs and they permit the wheels $f$ to follow irregularities in the ground surface without imposing undue strain upon the wheels or the frame. The bottom of the frame is also formed with longitudinally extending skids or shoes $h$ which are normally supported by the wheels above the ground but they are adapted to engage the ground due to the yielding of the springs $g$ during landing of the aeroplane, these skids or shoes serving in effect as brakes to bring the aeroplane to a standstill.

The motor $i$ is preferably mounted in the forward portion of the frame as shown, its shaft $l$ being provided with a sprocket wheel $m$, a chain $n$ connects the sprocket wheel $m$ on the engine shaft to a sprocket wheel $o$ on the propeller shaft $p$, the propeller shaft being suitably mounted in the upper portion of the frame and this shaft carries a propeller $j$ which in the present instance is arranged in rear of the wings.

According to the present invention the lateral edges of the wings are provided with longitudinally arranged flanges which prevent the air from flowing outwardly and laterally from the under side of the wing and the air from flowing inwardly and laterally above the wing owing to the vacuum produced upon the upper side of the wing during flight.

In Figs. 12 to 14 inclusive I have shown one of the wings as provided with a pair of flanges $q$ which extend downwardly and in a perpendicular direction from the lateral edges thereof, and Fig. 12 which represents a bottom plan view of the wing and its flanges indicates diagrammatically and by the dotted lines the manner in which the air is confined at the under side of the wing and prevented from escaping outwardly and laterally from its edges as shown diagrammatically in Fig. 8 which represents the ordinary form of wing. Figs. 15 to 17 inclusive show the wing as provided with flanges $q'$ which project upwardly and perpendicularly from the lateral edges of the wing.

Fig. 15 which represents a top plan view of the wing and its upstanding flange illustrates diagrammatically and by the dotted lines the manner in which the air is prevented from flowing inwardly and to the upper side of the wing during flight so as to destroy the vacuum effect produced at the upper surface $s$ of the wing as takes place in the ordinary form of wing devoid of such flanges, such action of the air being shown diagrammatically in Fig. 9.

Figs. 18 and 19 show a wing having both the downwardly extending flanges $q$ and the upwardly extending flanges $q'$, these flanges extending perpendicularly and preventing the air from escaping laterally from beneath the lower surface $r$ of the wing and from flowing inwardly above the upper surface $s$ of the wing. In Fig. 20 I have shown a wing in which these flanges $q$ and $q'$ extend obliquely instead of perpendicularly. These flanges at the lateral edges of the wings insure efficient action of the front and rear adjustable planes as the air is presented to these adjustable planes at substantially a normal and there is no lateral deflection of the aeroplane due to oblique flow of the air as takes place in the ordinary form of aeroplane and as illustrated diagrammatically in Figs. 8 and 9. These flanges may be of uniform height from front to rear although preferably their vertical dimension increases in a direction from the front and toward the rear of the wing as shown in Figs. 14, 17 and 19 for in such cases the air is disturbed for a greater height toward the rear of the wing than toward the front and the increasing height of the flanges corresponds substantially to the disturbed area of the air. Moreover, this formation of the flanges minimizes the surface friction and the retarding effect.

I claim as my invention:—

1. In an aeroplane, a supporting or sustaining wing presenting a surface at a predetermined angle to the trajectory of the aeroplane, a pair of planes adjustably mounted at the rear edge of the wing and at opposite sides of the longitudinal axis thereof, means for limiting the adjustment of said planes whereby they are always presented to the trajectory at an angle not greater than that at which the wing is presented thereto, and means for adjusting said planes at different relative angles to steer and balance the aeroplane.

2. In an aeroplane, the combination of a supporting or sustaining wing, a pair of adjustable planes pivotally mounted at the forward edge of the wing and at opposite sides of the longitudinal axis thereof, a pair of adjustable planes pivotally mounted at the rear edge of the wing and at opposite sides of the longitudinal axis thereof, and means operatively connecting the forward planes to the respective rear planes.

3. In an aeroplane, the combination of a supporting or sustaining wing, a pair of adjustable planes pivotally mounted at the forward edge of the wing and at opposite sides of the longitudinal axis thereof in such a manner that they have always an angle of incidence as great or greater than the angle of incidence of the supporting or sustaining wing, a pair of adjustable planes pivotally mounted at the rear edge of the wing and at opposite sides of the longitudinal axis thereof in such a manner that they have always an angle of incidence not greater than the angle of incidence of the supporting or sustaining wing, and means operatively connecting the forward planes to the respective rear planes.

In testimony whereof I have hereunto set my hand in presence of two subscribing witnesses.

RENÉ ARNOUX.

Witnesses:
 DEAN M. MASON,
 ARMAND MORNE.